United States Patent

Fu

[11] Patent Number: 5,837,075
[45] Date of Patent: Nov. 17, 1998

[54] ANTI-SKID CHAIN

[76] Inventor: Yang-Cheng Fu, 3F., No.18, Lane 24, Sec.3, Jen-Ai Rd., Taipei City, Taiwan

[21] Appl. No.: 731,481
[22] Filed: Oct. 16, 1996
[51] Int. Cl.$^6$ .................................................. B60C 27/06
[52] U.S. Cl. ........................ 152/213 A; 152/216; 152/233
[58] Field of Search ........................................... 152/213 A

[56] References Cited

U.S. PATENT DOCUMENTS 3,762,456  10/1973  Clouston .............................. 152/213 A
3,842,881  10/1974  Muller et al. ........................ 152/213 A
3,884,283   5/1975  Engel .................................. 152/213 A Primary Examiner—Francis J. Lorin

[57] ABSTRACT

An improved anti-skid chain structure is equipped with a plurality of chain units that are arranged in parallel around a tire. The chain units are coupled together end to end on each side of the tire by a plurality of connection bars and a plurality of two-ended hooks and coupling members. A locking member mounted to the connection bars is used to lock the chain to the tire and a tightening member secured to the connection bars disposed on one side of the tire firmly secures the chain to the tire during use.

1 Claim, 4 Drawing Sheets

ANTI-SKID CHAIN

BACKGROUND OF THE INVENTION

The present invention relates to an improved anti-skid chain having a plurality of chain units that are disposed in a parallel manner and coupled together end to end by connection bars that are held and tightened together by a tightening member disposed in abutment against the sides of a wheel. Thus, chain units are able to be in firm grasp contact with the surface of a tire. The anti-skid chain can be mounted to a tire with ease and speed and dismounted therefrom in the same manner.

Vehicles equipped with rubber tires are difficult to control when driven on a snowy or icy road. The rubber tires have good friction and ground grasping abilities when driven on normal roads. Nevertheless, the rubber tire tread cannot function on a snowy or icy road when brakes are applied, resulting in collisions or accidents. So, anti-skid chains of various kinds have been designed and applied to vehicles in snowy winter days.

However, the conventional anti-skid chains have tire following disadvantages in common.

1. The conventional tire chains made of iron are relatively too heavy, adding extra burden to vehicles.

2. Such tire chains are in general not firmly attached to the tires, resulting in the random shifting of the chains in driving and causing uncontrollable driving conditions.

3. The prior art tire chains made of iron are relatively soft and easily worn out in constant use.

SUMMARY OF THE INVENTION

The primary object of the present invention is to provide an improved anti-skid chain which can be quickly mounted to the tire of a wheel assembly.

Another object of the present invention is to provide an improved anti-skid chain which is made of an abrasion resistant and pressure durable hard material to permit the chain to be operated at low temperature high pressure enviroment conditions for a longer term.

One further object of the present invention is to provide an improved anti-skid chain having a plurality of tread chain units that are coupled together piece by piece by a pair of opposed circular connection assemblies.

DETAILED DESCRIPTION OF THE PREFERRED EMBODIMENTS

Figure 1:
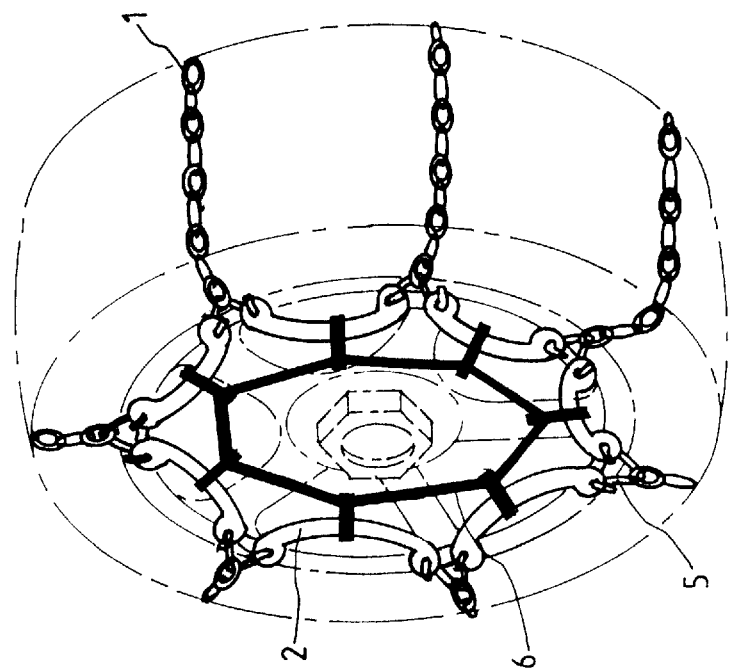
FIG. 1 is a perspective diagram showing the arrangement of the anti-skid chain of the present invention on the outer side of a wheel assembly.
Figure 2:
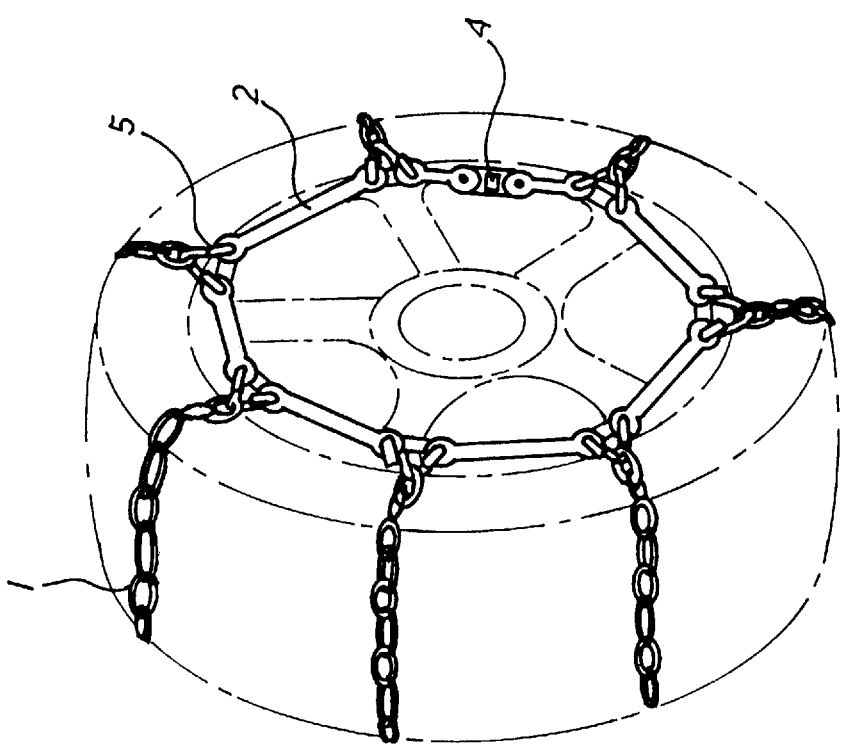
FIG. 2 is a perspective diagram showing the arrangement of the anti-skid chain on the inner side of a wheel assembly.

Referring to FIGS. 1, 2, the improved anti-skid chain of the present invention is comprised of a plurality of tread chain units 1 and a pair of opposed connection assemblies including, connection bars 2, coupling members 3, and hooks 5, and a locking means 4.

Each chain unit 1 made up of a plurality of O-shaped rings that are connected to one another end to end so as to form a lengthy chain uint. Each ring is made of special high pressure durable and abrasion resistant steel alloy. Each connection bar 2 is made of resilient plastic material.

Each coupling plate 3 is an oval-like plate having a hole 31 defined at each end thereof. The locking means 4 is a specific retaining member for joining and locking purpose. Each hook bar 5 is a symmetrically bent bar having a hooked end 51 at each terminal thereof.

Figure 3:
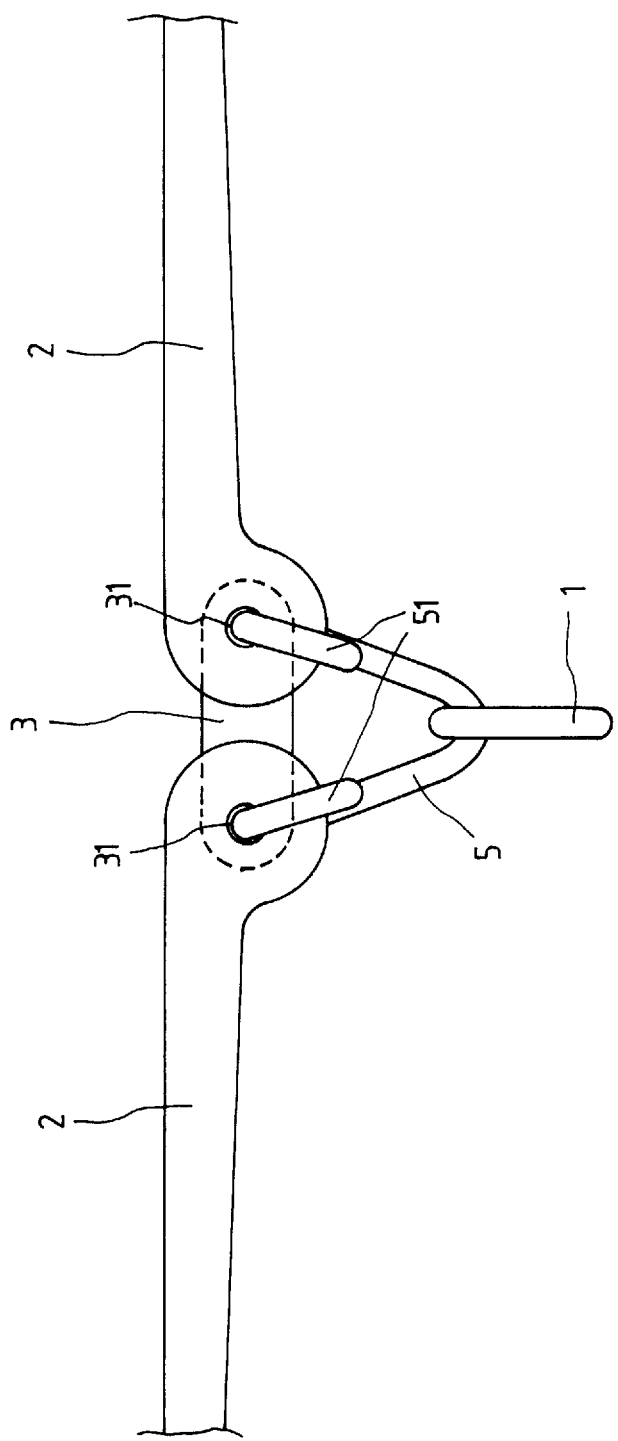
FIG. 3 is a partially enlarged portion of the anti-skid chain viewed from the outer side of a wheel assembly.
Figure 4:
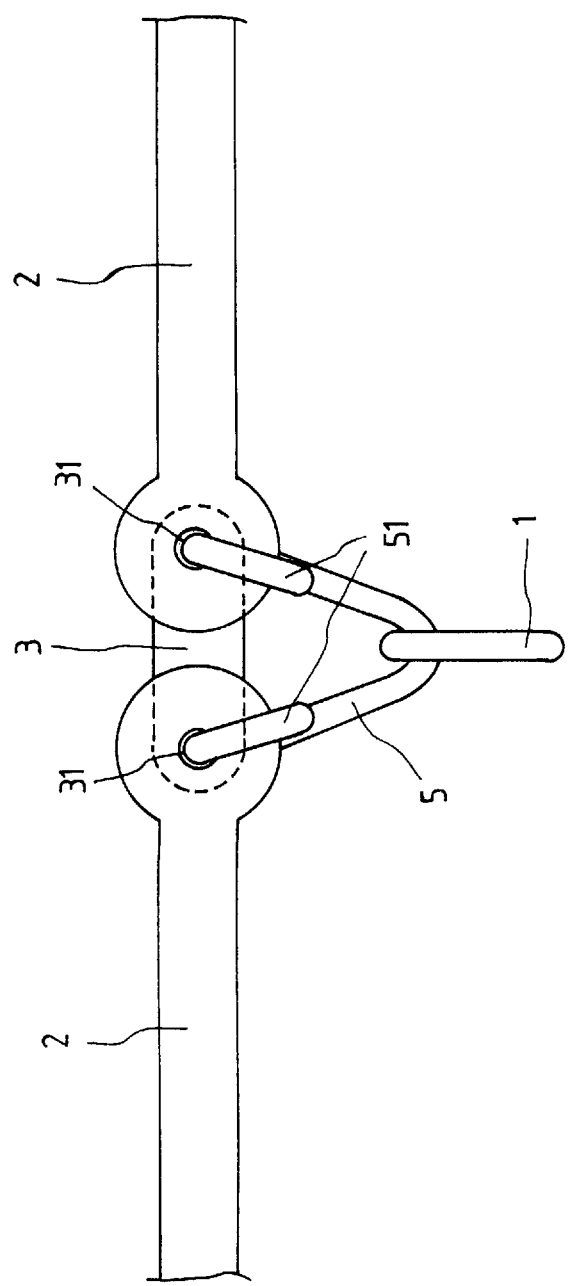
FIG. 4 is a partially enlarged portion of the anti-skid chain viewed from the inner side of a wheel assembly.

The proceeding components are assembled together in the following manner. The O-shaped rings disposed at each end of the chain unit 1 are engaged first with a hook bar 5 respectively and the hooked ends 51 of a hook bar 5 are engaged with the holes 31 of a coupling plate 3. Then, one hooked end 51 of the hook bar 5 is led to engage with one end of a connection bar 2 and the other hooked end 51 of the same hook bar 5 is in engagement with the hole 31 of a neighboring connection bar 2, as shown in FIG. 3, to complete the basic joining process. Such procedure is repeated until the chain units 1 are coupled together one by one, as shown in FIGS. 1, 2.

The locking means 4 is disposed between two connection bars 2 on one side of the tire and is opened at the start of mounting the anti-skid chain of the present invention onto a tire and is locked for securing the chain in place. A tightening member 6 is further hooked to the connection bars 2 on the other side of the tire so as to firmly and properly extend bar 2, thus permitting the chain units 1 to be in grasping abutment against the peripheral tread portion and opposed sidewall portions of the tire, as shown in FIG. 1.

It becomes apparent that the anti-skid chain of the present invention has the following advantages over the conventional ones.

1. The anti-skid chain can be easily mounted onto and reversely dismounted from a tire in use.

2. The anti-skid chain of the present invention is evenly and firmly distributed around a tire by way of a tightening member so as to ascertain steady and safe operation of tires in use.

3. The anti-skid chain of the present invention is made of lightweight steel alloy, so it is hard, abrasion resistant and is not easily worn out and its weight is only half that of a conventional iron chain.

4. The anti-skid chain of the present invention uses a locking member and a tightening member, making the chain firmly fixed to a tire without being easily detached or loosened.

I claim:

1. An anti-skid chain for a wheel assembly that includes a tire having a peripheral tread, which chain comprises:

a) a plurality of chain units for positioning in a spaced parallel array around the peripheral tread of the tire;

b) a pair of substantially circular connection assemblies for positioning on opposite sides of the wheel assembly for connecting the chain units together and securing the chain units against the peripheral tread of the tire;

c) each connecting assembly including a plurality of connection bars, each connection bar having a first hole formed in each of a pair of opposite ends of the bar, a plurality of coupling members, each coupling member having a second hole formed in each of a pair of opposite ends of the member, the second holes of each coupling member being aligned with the first holes of an adjacent pair of connection bars, a plurality of hook bars, each hook bar including a pair of hooked ends engaged through the aligned first and second holes of each coupling member and its associated connector bars, and each chain unit having a first end connected to a hook bar on one side of the wheel assembly and a second end connected to a hook bar on the opposite side of the wheel assembly;

d) one connection assembly including a locking means at a connection bar for permitting the connection assembly to open during attachment of the chain to and removal of the chain from the wheel assembly; and e) the other connection assembly including means for extending the connection bars and tightening the chain units around the peripheral tread of the tire.

* * * * *